Figure 1:
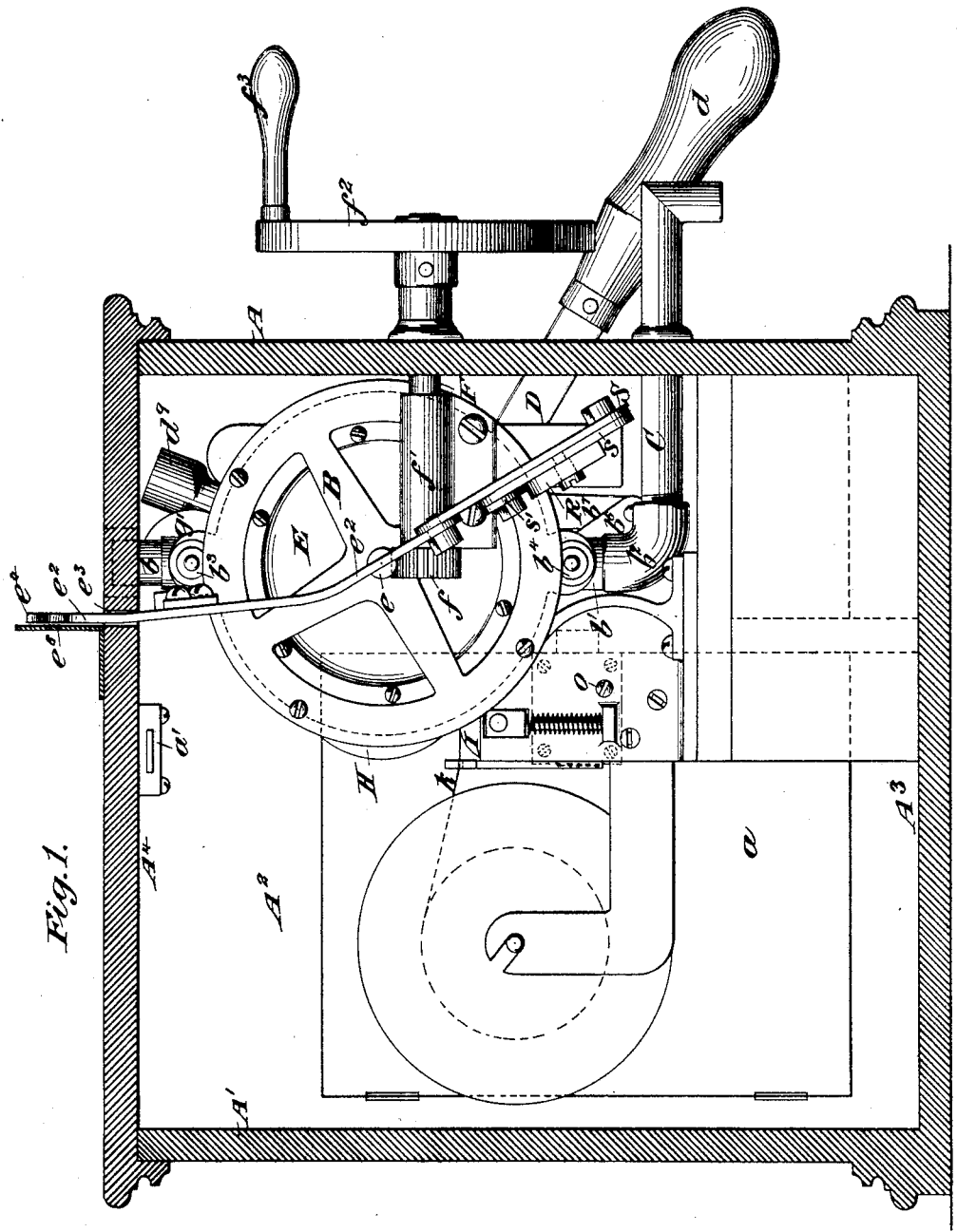

(No Model.) 4 Sheets—Sheet 1.
W. M. FOWLER.
APPARATUS FOR DISPENSING DRINKS.

No. 457,913. Patented Aug. 18, 1891.

Witnesses:
Inventor:
William M. Fowler
by attorneys (No Model.) 4 Sheets—Sheet 2.
W. M. FOWLER.
APPARATUS FOR DISPENSING DRINKS.
No. 457,913. Patented Aug. 18, 1891.
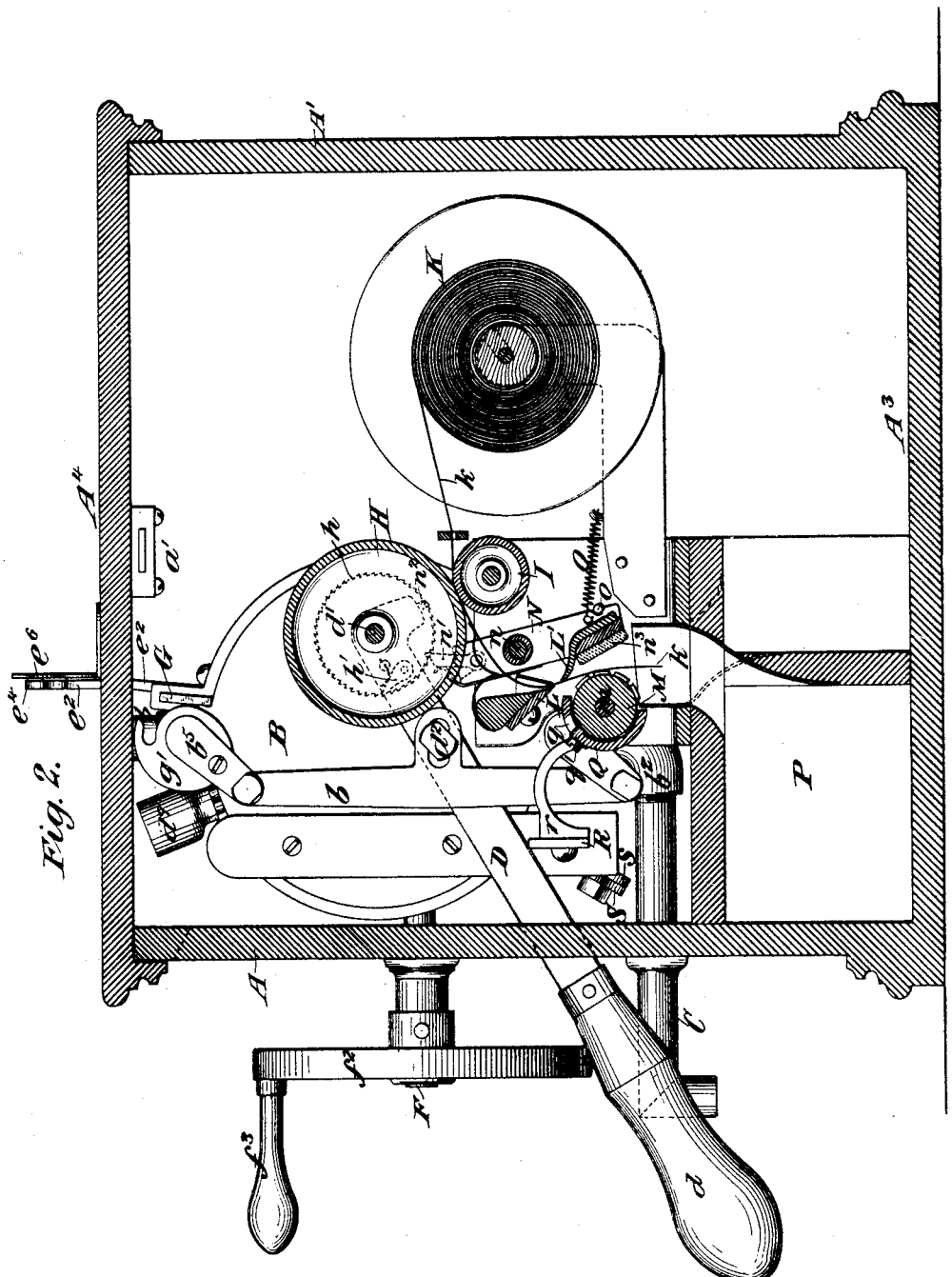
Witnesses:—
O. N. Hayward
C. L. Sundgren
Inventor:—
William M. Fowler
by attorneys
Brown & Seward (No Model.) 4 Sheets—Sheet 3.
W. M. FOWLER.
APPARATUS FOR DISPENSING DRINKS.
No. 457,913. Patented Aug. 18, 1891.
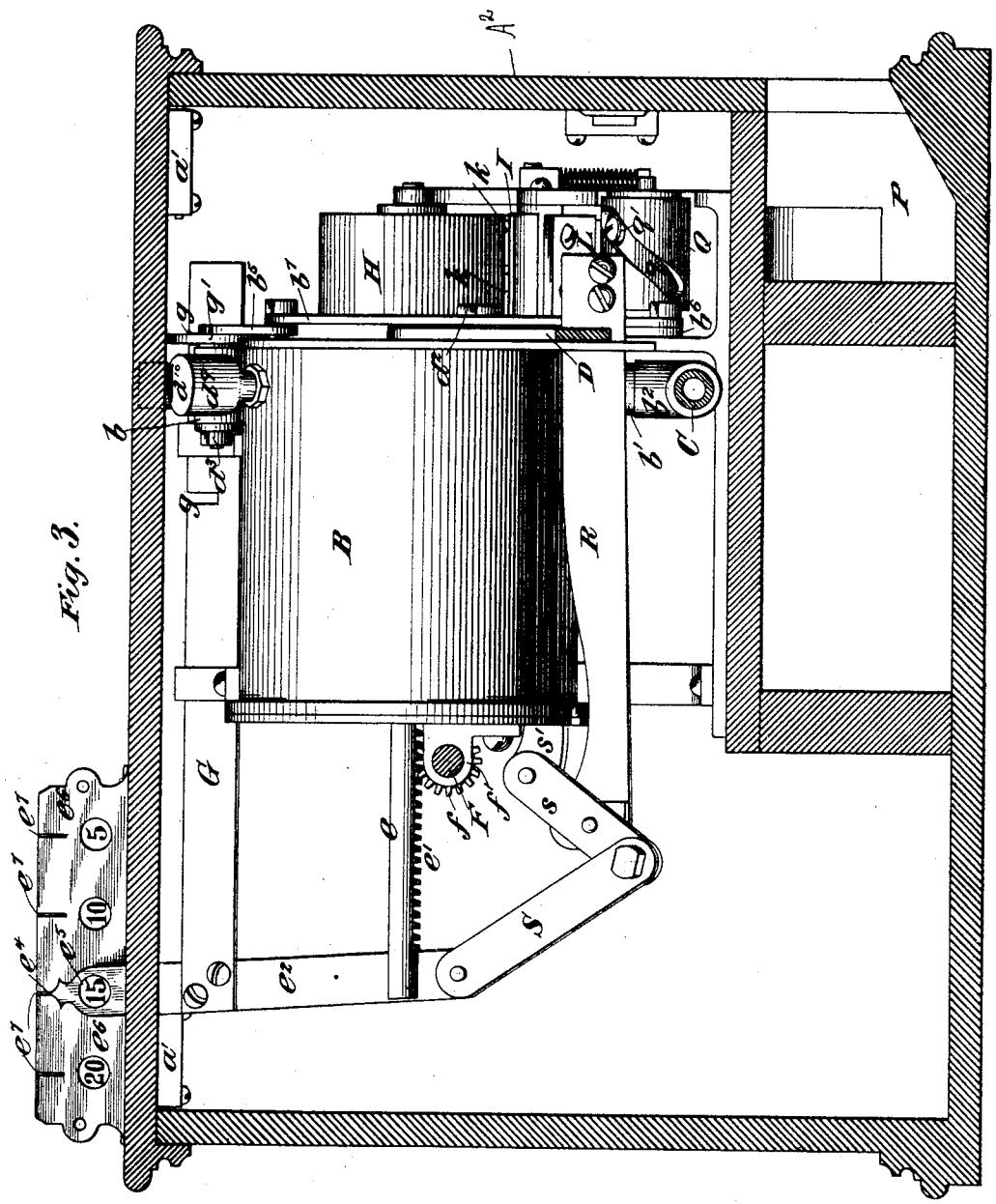
Witnesses:
D. H. Hayward
C. E. Sundgren
Inventor:
William M. Fowler
by attorneys
Brown Seward (No Model.) 4 Sheets—Sheet 4.
W. M. FOWLER.
APPARATUS FOR DISPENSING DRINKS.
No. 457,913. Patented Aug. 18, 1891.
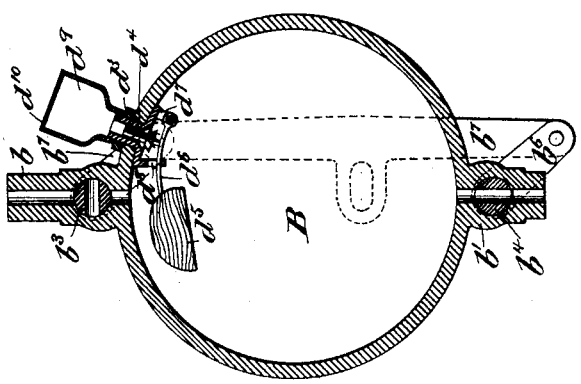
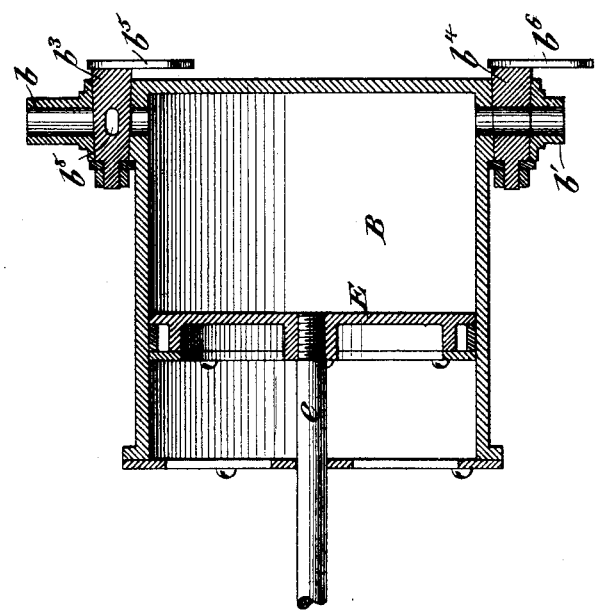
Witnesses:—
Inventor:—
William M. Fowler
by attorneys

UNITED STATES PATENT OFFICE.

WILLIAM M. FOWLER, OF MILFORD, CONNECTICUT.

APPARATUS FOR DISPENSING DRINKS.

SPECIFICATION forming part of Letters Patent No. 457,913, dated August 18, 1891.

Application filed January 17, 1891. Serial No. 377,971. (No model.)

*To all whom it may concern:*

Be it known that I, WILLIAM M. FOWLER, of Milford, in the county of New Haven and State of Connecticut, have invented a new and useful Improvement in Apparatus for Dispensing Drinks, of which the following is a specification.

My invention relates to an improvement in apparatus for dispensing drinks, in which provision is made for regulating the quantity dispensed, indicating a predetermined price for that quantity, and making a record of that price.

My present invention more particularly contemplates mechanism for regulating the quantity of liquid to be dispensed, an indicating mechanism which shall indicate the price of the quantity to which the dispensing mechanism is adjusted, and printing mechanism which shall also be adjusted to print the price corresponding to the quantity to which the dispensing mechanism has been adjusted, the said indicating mechanism and printing mechanism being under the control of the mechanism for regulating the quantity and the dispensing mechanism, so that, it having been once determined what quantity shall be dispensed and the dispensing mechanism set in operation, it shall be impossible to obtain any portion of the liquid for use without making a permanent record of the price thereof beyond the control of the operator.

A practical embodiment of my invention is represented in the accompanying drawings,—in which—

Figure 1 is a view of the apparatus in side elevation, taken in section through the casing. Fig. 2 is a view in side elevation, partly in section, taken from the opposite side. Fig. 3 is a view in front elevation, taken in section through the casing. Fig. 4 is a vertical longitudinal section in detail through the measuring-receptacle, showing the inlet and outlet valves in position; and Fig. 5 is a view in transverse section in detail through the measuring-receptacle, showing the air-escape valve in position.

A represents the front, A' the back, $A^2$ the sides, $A^3$ the bottom, and $A^4$ the top, of a suitable casing adapted to inclose the operative parts of the apparatus, so as to prevent access thereto by any other person than the one holding the key. For the purpose of such access a door $a$ is provided in one of the sides $A^2$ and fitted with a lock of any ordinary or approved kind, and for further access to the various parts of the apparatus I find it desirable to secure the cover $A^4$ by means of one or more suitable locks $a'$, of any well-known or approved form, in such a manner that it may be removed at pleasure by the person holding the key.

The dispensing mechanism comprises a measuring-receptacle B, preferably of circular form, as herein shown, and fixed in the upper portion of the casing. It is provided on its upper side, and preferably at or near one of its ends, with an upwardly-extending neck $b$ for the reception of the end of a hose or any other well-known or suitable connection for establishing communication between the measuring-receptacle and a supply-reservoir located outside of the casing. On its lower side, and preferably diametrically opposite the neck $b$, there is formed another neck $b'$, connected by a suitable coupling $b^2$ with a discharge-spout C, which extends to a point without the casing, and through which the liquid to be dispensed is conveyed to the vessel which is to receive it.

Through the necks $b$ and $b'$ extend rotary valves $b^3$ and $b^4$, to the outer ends of which are secured crank-arms $b^5$ and $b^6$, by means of which the valves are connected by a suitable connecting bar or rod $b^7$, so as to be simultaneously operated. The valves are so set in their seats that when the valve $b^3$ is rocked into position to bring its opening $b^8$ in alignment with the opening in the neck $b$ the valve $b^4$ will be rocked into position to close the opening through the neck $b'$, and when the valve $b^3$ is rocked into position to close the opening in the neck $b$, as shown in Fig. 4, the valve $b^4$ will be rocked in position with its opening in alignment with the opening in the neck $b'$.

An operating-lever D, with its handle $d$ located outside the casing, is fulcrumed at a suitable point $d'$ within the casing, and is loosely connected with the valve-operating bar $b^7$ at a point $d^2$, so that when the lever is rocked upon its fulcrum the valves $b^3$ and $b^4$ will also be rocked. In the present instance the arrangement and connection are such that when the lever D is depressed the valve $b^3$ for the admission of liquid in the measuring-receptacle will be closed and the valve $b^4$ for the discharge of the liquid from the measuring-receptacle will be open, and when the lever is raised to the upward limit of its stroke it will rock the valves into position to open the valve $b^3$ and close the valve $b^4$.

For the purpose of obtaining the necessary vent for the free discharge of the liquid from the measuring-receptacle after the valve $b^3$ is closed I provide a sliding valve $d^3$, seated in a suitable socket-piece $d^4$, inserted through the wall of the measuring-receptacle, preferably in proximity to the neck $b$. The stem of the valve is made triangular in cross-section, so that when the valve is lifted from its seat there will be free communication along the sides of its stem between the interior of the receptacle and the outer air. A float $d^5$ is secured to the free end of a valve-operating arm $d^6$, fulcrumed to a suitable inwardly-projecting lug $d^7$ and connected with the valve $d^3$ intermediate of its fulcrum and the float $d^5$. The valve-operating arm $d^6$ is limited in its movement by an elongated recess or slot $d^8$ in a lug depending within the receptacle. As the receptacle fills with liquid it will lift the float $d^5$ and close the valve $d^4$. When, however, the discharge-valve $b^4$ is opened, the float $d^5$ will fall as the surface of the liquid lowers, opening the valve $d^4$ and allowing the free discharge of the liquid.

To prevent any issue of foam or mist which might escape through the valve-seat during the filling of the receptacle from escaping down the exterior of the receptacle, I provide a cup $d^9$, secured liquid-tight around the outer end of the valve-seat and inclosed upon all sides, with the exception of a small opening in its upper outer corner $d^{10}$. By this provision any slight quantity of liquid which might escape will be promptly returned within the reservoir when the discharge-valve is open.

The operation of the dispensing mechanism as thus far described will be readily understood.

In connection with the above-described mechanism I provide means for regulating the quantity of liquid to be dispensed at one time, as follows: The end of the measuring-receptacle B, opposite that at or near which the inlet and discharge mechanism is located, consists of a piston E, which fits liquid-tight within the receptacle and is adapted to slide longitudinally therein and thereby increase or decrease at pleasure the space between it and the fixed end of the receptacle, and hence increase and decrease the amount of liquid which will be required to fill the space. The piston E is operated by means of a rod or bar $e$, provided along one of its sides with a series of teeth $e'$, forming in effect throughout a greater portion of its length a rack-bar. A pinion $f$ is fixed upon a rotary shaft F, mounted in suitable bearings $f'$, the said pinion being adapted to engage the rack-bar and when rotated to move the rack-bar or rod $e$, and hence the piston E, fixed thereto, longitudinally within the measuring-receptacle. The shaft F projects through the side of the casing and is provided on its outer end outside the casing with suitable means for rotating it. In the present instance I have shown a crank-wheel $f^2$, provided with a handle $f^3$. Fixed to the outer end of the rod or bar $e$ is an upwardly-extending arm $e^2$, which projects up through an elongated slit $e^3$ in the top of the casing and is provided at its upper end, without the casing, with a point $e^4$ or sight-hole $e^5$ or both. Alongside of the slit $e^3$, through which the arm $e^2$ extends, there is located an index-plate $e^6$, provided on its face with figures or characters indicating the prices of different quantities of liquids to be dispensed. In the present form of my apparatus I have made provision for dispensing four different quantities and have assumed as their prices five, ten, fifteen, and twenty cents, respectively. The plate $e^6$ therefor presents in the present instance figures or characters located at intervals apart and indicating "5," "10," "15," and "20." The numbers or characters are made of such size that they may be seen through the sight-hole $e^5$ in the arm $e^2$ when the latter is centered with respect thereto, and I have further provided centrally above each of the said characters narrow slits or notches $e^7$ to indicate the points at which point $e^4$ on the arm $e^2$ is to stop in order to center for that particular quantity. From the above it follows that by turning the crank-wheel $f^2$ to adjust the arm $e^2$ to correspond with any one of the characters indicated on the plate $e^6$ the piston within the measuring-receptacle will be thereby moved within the receptacle to a position which will make its capacity sufficient to receive a quantity of liquid the price of which will correspond to the number indicated at the point where the arm $e^2$ rests. In the accompanying drawings this adjustment is shown as for a quantity the price of which is fifteen cents.

It is further desirable that after having once set the measuring-receptacle to receive a quantity the price of which is indicated as fifteen cents it shall not be possible to discharge that amount and subsequently change the indicator to a price less than fifteen before making the record. To provide against manipulation of that character, I attach a sliding bar G at one end to the arm $e^2$ and extend the bar along over the measuring-receptacle in proximity to the valve $b^3$. I provide the said bar with recesses $g$, corresponding to the subdivisions on the indicator-plate $e^6$, and eccentrically on the stem of the valve $b^3$ I fix a plate $g'$, adapted to engage one of the recesses $g$ when the valve is rocked, and thereby lock the bar G, and hence the arm $e^2$ and piston against a sliding movement until the said plate $g'$ shall have been rocked out of engagement with the bar G. The arrangement is such that when the operating-lever D is elevated for the purpose of drawing liquid into the measuring-receptacle it can only operate when the bar G is moved by the indicator-arm $g^2$ to such a point as will bring one of the recesses $g$ in position to allow the plate $g'$ to enter therein, and when it is so adjusted and the operating-lever D elevated and valves rocked into position to fill the receptacle it will not be possible to shift the said indicating mechanism or piston until the operating-lever shall have been depressed and the liquid thereby dispensed, or at least until after the permanent record has been made by mechanism which will be hereinafter described.

The mechanism for forming the record is constructed and arranged as follows: Upon an axis coincident with the fulcrum $d'$ of the operating-lever D a feed-roller H is loosely mounted and provided with an annular series of internal ratchet-teeth $h$. A spring-actuated pawl $h'$, carried by the operating-lever D at a point a short distance from its fulcrum, is adapted to normally engage the series of ratchet-teeth $h$, and when the lever D is raised the roller H will be rotated by the engagement of the pawl $h'$ therewith; but when the lever is depressed the said pawl $h'$ will pass freely over the ratchet-teeth. A guide and pressure roller I is loosely mounted upon a suitable support, with its periphery in close contact with the periphery of the roller H. Between these two rollers H and I two strips $k$ of material, to receive the record, pass from a supply-roll K, and are led thence downwardly between the blades L and L' of a cutter and thence over the face of a type-roller M. The movable blade L' of the cutter is fixed to the lower end of a vibrating arm N, pivotally secured in a suitable support $n$ and carrying upon its upper end a spring-actuated dog $n'$, the latter having a limited swinging movement with respect to the vibrating arm N. The nose of the dog $n'$ projects upwardly into the path of a projection $n^2$ on the end of the operating-lever D, and the vibrating arm N is held normally with its lower end swung back away from the face of the type-roller M and the movable blade L' away from its stationary blade L by a spring O, the swing of the arm N, under the tension of the spring O, being limited by a suitable abutment $o$. When swung into its normal position under the tension of the spring O, the said arm N will carry the dog $n'$ into such position that the operating-lever D will engage it just before the said operating-lever reaches the extremity of its upward stroke, and by the yielding of the dog $n'$ the projection $n^2$ on the lever will be allowed to slip past the dog. Just as soon, however, as the operating-lever begins to descend the projection $n^2$ on its end in engagement with the dog $n'$ will rock the vibrating arm N, causing the movable blade L' of the cutter to approach the stationary blade L and at the same time forcing the impression-pad $n^3$, fixed to the lower end of the arm N, toward the type on the type-roller M. This action of the vibrating arm N will sever the two strips and will force the strips into contact with the type and form the impression thereon. The operating-lever D in its further downward movement will disengage the dog $n'$, and the arm N, with the parts carried thereby, will be returned to its normal position under the tension of the spring O, and the printed slips will be allowed to fall. One of them will be conducted into a receptacle P, to which access may be had at all times from the outside of the casing, and the other, its duplicate, will be conducted within the casing and access thereto can be had only by the person holding the key to the door of the casing.

As there are different prices corresponding to the different quantities of liquid dispensed, it is essential that provision should be made for changing the type which is to make the impression to correspond with the price of the particular quantity dispensed. To accomplish this, the type-roller M is provided at intervals around its periphery with as many duplicate sets of type as there are different quantities to be dispensed. The roller M is loosely mounted upon its support $m$, and upon its periphery there is loosely seated a concave plate Q, provided with an elongated oblique slot $q$, into which a stud $q'$, projecting from the periphery of the roller M, projects. The plate Q has a sliding movement longitudinally along the periphery of the roller M, and is operated and held against rotating with the roller by an endwise-sliding bar R, fixed to the plate Q at one end by an arm $r$ and connected at its opposite end with the arm $e^2$ by means of a pair of links S and $s$. The links S and $s$ are pivotally secured to each other at one end and at their opposite ends are pivoted, respectively, to the arm $e^2$ and to a support $s'$. The end of the sliding bar R is pivoted to the link $s$ intermediate of its connection with the link S and its support $s'$. The movement of the bar R and the consequent rotary movement of the type-roller M by the engagement of the walls of the oblique slide $q$ with the stud $q'$ are so regulated that the movement of the piston E to adjust the measuring-receptacle to any particular quantity of liquid to be dispensed will rotate the type-roller M so as to present in position to print that set of type which corresponds to the price of the quantity to which the measuring-receptacle has been adjusted.

The operation of the apparatus as a whole may be briefly stated as follows: The crank-wheel $f^2$ is turned to adjust the piston within the measuring-receptacle to the desired quantity to be dispensed. Such movement of the piston will move the arm $e^2$, and the latter will indicate when the capacity of the measuring-receptacle is sufficient to receive just the desired quantity. Such movement of the piston will also move the bar G into position to lock the piston and will also, through the links S and s, slide the bar R, and thereby rotate the printing-roller into position to print the price of the quantity to which the measuring-receptacle has been adjusted, and which is indicated by the arm $e^2$. The operating-lever D being now raised, the plate $g'$ will engage the bar G and lock the piston in position, and the valves $b^3$ and $B^4$ will be rocked, the former to admit liquid into the measuring-receptacle and the latter to close its discharge therefrom. When the measuring-receptacle has become filled, the depression of the operating-lever will, during the early part of its movement and before the valve is opened for the discharge of the liquid from the measuring-receptacle, operate the vibrating arm N, and thereby form the impression and sever the printed slips, and during its further movement will close the inlet-valve and open the discharge-valve, allowing the liquid to be discharged through the spout C into the receiving-vessel without the casing.

What I claim is—

1. The combination, with a measuring-receptacle, means for varying its capacity, and means for controlling the admission of liquid to the receptacle and its discharge therefrom, of a recording mechanism under the control of the means for varying the capacity of the receptacle to set it and under the control of the means for admitting and discharging the liquid to make the record, substantially as set forth.

2. The combination, with a measuring-receptacle, means for varying its capacity, and a recording mechanism under the control of the capacity-varying mechanism to set it, of a valve for admitting liquid to the receptacle, a valve for discharging the liquid from the receptacle, an operating-lever in connection with the two valves to operate them simultaneously, impression mechanism under the control of the lever to make the record, and mechanism for feeding the material to receive the record, said feeding mechanism being also under the control of the operating-lever, substantially as set forth.

3. The combination of the measuring-receptacle, inlet and outlet devices for the admission of liquid to the receptacle and its discharge therefrom, an operating-lever for controlling the inlet and outlet devices, recording mechanism and feed mechanism, the said recording and feed mechanisms being under the control of said operating-lever, substantially as set forth.

4. The combination, with the measuring-receptacle and means for regulating the entrance of liquid into and its discharge therefrom, of means for varying the capacity of the said receptacle, a type-roller provided with different sets of type, a connection between the type-roller and the means for varying the capacity of the receptacle, whereby the type-roller is moved with relation to the different capacities, and means for receiving an impression from the type, substantially as set forth.

5. The combination, with the measuring-receptacle, means for controlling the entrance of liquid to and its discharge from the receptacle, and a piston adapted to slide within the receptacle to vary its capacity, of a type-carrier provided with different sets of type, a connection between the type-carrier and the sliding piston, means for sliding the piston and thereby adjusting the type-carrier, and means for receiving the impression from the type upon the type-carrier, substantially as set forth.

6. The combination, with the measuring-receptacle, means for controlling the admission of liquid to and its discharge therefrom, and a piston adapted to slide within the receptacle to vary its capacity, of a rotary type-carrier, a sliding plate having a cam engagement with the roller, a connection between the sliding plate and the piston, means for operating the piston and hence the rotary type-carrier, and means for receiving an impression from the type upon the type-carrier, substantially as set forth.

7. The combination, with the measuring-receptacle, an inclosing case surrounding the receptacle, means for regulating the inlet of liquid into and its discharge from the receptacle, of means for varying the capacity of the receptacle, an indicator connected with said means for varying the capacity and projecting without the casing, an index upon the outer side of the casing to indicate the value of predetermined amounts of liquid within the receptacle, and a recording mechanism under the control of the means for varying the capacity to form a record corresponding to the value indicated upon the index, substantially as set forth.

8. The combination, with the measuring-receptacle, means for controlling the entrance of liquid into and its discharge therefrom, and mechanism for varying the capacity of the receptacle, of an indicating mechanism operated by said capacity-varying mechanism, a type-carrier provided with different sets of type and controlled by said capacity-varying mechanism, and means for receiving the impression from the type upon the carrier, substantially as set forth.

9. The combination, with the measuring-receptacle, devices for regulating the entrance of liquid into the receptacle and its discharge therefrom, and an operating-lever for controlling the said inlet and discharge devices, of mechanism for varying the capacity of the receptacle, and a locking mechanism under the control of the operating-lever to lock the capacity-varying mechanism in its adjustment, substantially as set forth.

10. The combination, with the measuring-receptacle, devices for regulating the inlet of liquid into and its discharge from the receptacle, and an operating-lever for controlling the said inlet and outlet devices, of mechanism for varying the capacity of the receptacle, a sliding bar in connection with said capacity-varying mechanism and provided with stops corresponding to the predetermined capacities, and a locking device under the control of the operating-lever and adapted to engage the stops upon the sliding bar and thereby lock the capacity-varying mechanism during the operation of the operating-lever, substantially as set forth.

11. The combination, with the measuring-receptacle, an operating-lever, and means for controlling the admission of liquid into and its discharge from the receptacle under the control of said operating-lever, of a piston adapted to slide within the receptacle to vary its capacity, a rack in connection with the piston-rod, a pinion adapted to engage the rack, and a rotary shaft independent of said operating-lever for operating the pinion, substantially as set forth.

12. The combination, with the measuring-receptacle, the sliding piston and its rod, of the type-carrier, the sliding bar for operating the type-carrier, a link connection between the sliding bar and the piston-rod for reducing the throw of the operating-bar, and means for operating the piston, substantially as set forth.

13. The combination, with the operating-lever provided with a lateral projection at its end and a type-carrier, of a vibrating arm carrying an impression-pad at one end and at its opposite end provided with a swinging dog extending into the path of the projection on the lever and free to swing in one direction to allow the lever to pass, but having an engagement with the arm when the lever is swung in the opposite direction, thereby causing the arm to swing with the lever, and means for feeding the material to receive the impression between the pad and the type-carrier, substantially as set forth.

14. The combination, with the overating-lever and the vibrating arm adapted to be rocked by the lever, of a cutter-blade and impression-pad secured to the vibrating lever, a stationary blade, a type-carrier, and means for feeding the material to be impressed between the said stationary and movable blades and between the pad and type-carrier, substantially as set forth.

15. The combination, with the operating-lever and the printing mechanism, of a feed-roller for advancing the material to receive the impression, said feed-roller being provided with an annular series of ratchet-teeth, and a pawl carried by the operating-lever and adapted to engage the ratchet-teeth and thereby advance the roller as the lever is operated, substantially as set forth.

16. The combination, with the measuring-receptacle, its inlet and discharge valves, their operating-cranks, and the bar connecting their cranks, of an operating-lever having a loose connection with said connecting-bar, a feed-roller operated by said lever during its stroke in one direction, an impression device operated by said lever during its stroke in the opposite direction, a type-carrier, and means for receiving the impression, substantially as set forth.

WILLIAM M. FOWLER.

Witnesses:
 FREDK. HAYNES,
 GEORGE BARRY.